(12) United States Patent
Perkins et al.

(10) Patent No.: US 12,407,296 B2
(45) Date of Patent: Sep. 2, 2025

(54) PHOTOVOLTAIC SHINGLES WITH MULTI-MODULE POWER ELECTRONICS

(71) Applicant: GAF Energy LLC, Parsippany, NJ (US)

(72) Inventors: Richard Perkins, San Jose, CA (US); Gabriela Bunea, San Jose, CA (US); Thierry Nguyen, San Francisco, CA (US); Lewis Abra, San Francisco, CA (US); Babak Farhangi, San Jose, CA (US); Hasib Amin, Parsippany, NJ (US); Henry Pham, San Jose, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/949,344

(22) Filed: Nov. 15, 2024

(65) Prior Publication Data

US 2025/0080045 A1    Mar. 6, 2025

Related U.S. Application Data

(63) Continuation of application No. 18/584,881, filed on Feb. 22, 2024, now Pat. No. 12,176,849.
(Continued)

(51) Int. Cl.
| | |
|---|---|
| *H02S 40/36* | (2014.01) |
| *E04D 1/30* | (2006.01) |
| *H02S 20/25* | (2014.01) |

(52) U.S. Cl.
CPC ............... *H02S 40/36* (2014.12); *E04D 1/30* (2013.01); *H02S 20/25* (2014.12); *E04D 2001/308* (2013.01)

(58) Field of Classification Search
CPC .......... H02S 40/36; H02S 20/25; H02S 20/23; H02S 40/34; E04D 1/30; E04D 2001/308; Y02B 10/10; Y02E 10/50
See application file for complete search history.

(56) References Cited

U.S. PATENT DOCUMENTS

| | | |
|---|---|---|
| 1,981,467 A | 11/1934 | Radtke |
| 3,156,497 A | 11/1964 | Lessard |
| (Continued) | | |

FOREIGN PATENT DOCUMENTS

| | | |
|---|---|---|
| CA | 2829440 A | 5/2019 |
| CH | 700095 A2 | 6/2010 |
| (Continued) | | |

OTHER PUBLICATIONS

Sunflare, Procducts: "Sunflare Develops Prototype for New Residential Solar Shingles"; 2019 <<sunflaresolar.com/news/sunflare-develops-prototype-for-new-residential-solar-shingles>> retrieved Feb. 2, 2021.
(Continued)

*Primary Examiner* — Babajide A Demuren
(74) *Attorney, Agent, or Firm* — GREENBERG TRAURIG, LLP

(57) ABSTRACT

A system includes a plurality of building integrated photovoltaic modules installed on a roof deck and arranged in an array. The plurality of building integrated photovoltaic modules includes a first building integrated photovoltaic module and a second building integrated photovoltaic module, with the first building integrated photovoltaic module being vertically adjacent to the second building integrated photovoltaic module. Each of the building integrated photovoltaic modules includes a plurality of solar cells arranged in at least one row, and a power electronics unit. The power electronics unit is adjacent to a first end of one of the at least one row of the plurality of solar cells. The power electronics unit is
(Continued)

electrically connected to the plurality of solar cells. The power electronics unit of the first building integrated photovoltaic module is electrically connected to the power electronics unit of the second building integrated photovoltaic module.

30 Claims, 10 Drawing Sheets

Related U.S. Application Data

(60) Provisional application No. 63/486,574, filed on Feb. 23, 2023.

(56) References Cited

U.S. PATENT DOCUMENTS

| | | |
|---|---|---|
| 3,581,779 A | 6/1971 | Gilbert, Jr. |
| 4,258,948 A | 3/1981 | Hoffmann |
| 4,349,220 A | 9/1982 | Carroll et al. |
| 4,499,702 A | 2/1985 | Turner |
| 4,636,577 A | 1/1987 | Peterpaul |
| 5,167,579 A | 12/1992 | Rotter |
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,693,413 B2 * | 6/2020 | Rodrigues ............... H02S 40/36 |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |

(56) References Cited

U.S. PATENT DOCUMENTS

| | | | |
|---|---|---|---|
| 11,459,757 B2 | 10/2022 | Nguyen et al. | |
| 11,486,144 B2 | 11/2022 | Bunea et al. | |
| 11,489,482 B2 | 11/2022 | Peterson et al. | |
| 11,496,088 B2 | 11/2022 | Sirski et al. | |
| 11,508,861 B1 | 11/2022 | Perkins et al. | |
| 11,512,480 B1 | 11/2022 | Achor et al. | |
| 11,527,665 B2 | 12/2022 | Boitnott | |
| 11,545,927 B2 | 1/2023 | Abra et al. | |
| 11,545,928 B2 | 1/2023 | Perkins et al. | |
| 11,658,470 B2 | 5/2023 | Nguyen et al. | |
| 11,661,745 B2 | 5/2023 | Bunea et al. | |
| 11,689,149 B2 | 6/2023 | Clemente et al. | |
| 11,705,531 B2 | 7/2023 | Sharenko et al. | |
| 11,728,759 B2 | 8/2023 | Nguyen et al. | |
| 11,732,490 B2 | 8/2023 | Achor et al. | |
| 11,811,361 B1 | 11/2023 | Farhangi et al. | |
| 11,824,486 B2 | 11/2023 | Nguyen et al. | |
| 11,824,487 B2 | 11/2023 | Nguyen et al. | |
| 11,843,067 B2 | 12/2023 | Nguyen et al. | |
| 2001/0034982 A1* | 11/2001 | Nagao | H02S 20/23 52/173.3 |
| 2002/0053360 A1 | 5/2002 | Kinoshita et al. | |
| 2002/0129849 A1 | 9/2002 | Heckeroth | |
| 2003/0101662 A1 | 6/2003 | Ullman | |
| 2003/0132265 A1 | 7/2003 | Villela et al. | |
| 2003/0217768 A1 | 11/2003 | Guha | |
| 2004/0000334 A1 | 1/2004 | Ressler | |
| 2005/0030187 A1 | 2/2005 | Peress et al. | |
| 2005/0115603 A1 | 6/2005 | Yoshida et al. | |
| 2005/0144870 A1 | 7/2005 | Dinwoodie | |
| 2005/0178428 A1 | 8/2005 | Laaly et al. | |
| 2005/0193673 A1 | 9/2005 | Rodrigues et al. | |
| 2006/0042683 A1 | 3/2006 | Gangemi | |
| 2006/0046084 A1 | 3/2006 | Yang et al. | |
| 2007/0074757 A1 | 4/2007 | Mellott et al. | |
| 2007/0181174 A1 | 8/2007 | Ressler | |
| 2007/0193618 A1 | 8/2007 | Bressler et al. | |
| 2007/0249194 A1 | 10/2007 | Liao | |
| 2007/0295385 A1 | 12/2007 | Sheats et al. | |
| 2008/0006323 A1 | 1/2008 | Kalkanoglu et al. | |
| 2008/0035140 A1 | 2/2008 | Placer et al. | |
| 2008/0078440 A1 | 4/2008 | Lim et al. | |
| 2008/0185748 A1 | 8/2008 | Kalkanoglu | |
| 2008/0271774 A1 | 11/2008 | Kalkanoglu et al. | |
| 2008/0302030 A1 | 12/2008 | Stancel et al. | |
| 2008/0315061 A1 | 12/2008 | Fath | |
| 2009/0000222 A1 | 1/2009 | Kalkanoglu et al. | |
| 2009/0014057 A1 | 1/2009 | Croft et al. | |
| 2009/0014058 A1 | 1/2009 | Croft et al. | |
| 2009/0019795 A1 | 1/2009 | Szacsvay et al. | |
| 2009/0044850 A1 | 2/2009 | Kimberley | |
| 2009/0114261 A1 | 5/2009 | Stancel et al. | |
| 2009/0133340 A1 | 5/2009 | Shiao et al. | |
| 2009/0159118 A1 | 6/2009 | Kalkanoglu et al. | |
| 2009/0178350 A1 | 7/2009 | Kalkanoglu et al. | |
| 2009/0229652 A1 | 9/2009 | Mapel et al. | |
| 2009/0275247 A1 | 11/2009 | Richter et al. | |
| 2010/0019580 A1 | 1/2010 | Croft et al. | |
| 2010/0095618 A1 | 4/2010 | Edison et al. | |
| 2010/0101634 A1 | 4/2010 | Frank et al. | |
| 2010/0116325 A1 | 5/2010 | Nikoonahad | |
| 2010/0131108 A1 | 5/2010 | Meyer | |
| 2010/0139184 A1 | 6/2010 | Williams et al. | |
| 2010/0146878 A1 | 6/2010 | Koch et al. | |
| 2010/0159221 A1 | 6/2010 | Kourtakis et al. | |
| 2010/0170169 A1 | 7/2010 | Railkar et al. | |
| 2010/0186798 A1 | 7/2010 | Tormen et al. | |
| 2010/0242381 A1 | 9/2010 | Jenkins | |
| 2010/0313499 A1 | 12/2010 | Gangemi | |
| 2010/0325976 A1 | 12/2010 | DeGenfelder et al. | |
| 2010/0326488 A1 | 12/2010 | Aue et al. | |
| 2010/0326501 A1 | 12/2010 | Zhao et al. | |
| 2011/0030761 A1 | 2/2011 | Kalkanoglu et al. | |
| 2011/0036386 A1 | 2/2011 | Browder | |
| 2011/0036389 A1 | 2/2011 | Hardikar et al. | |
| 2011/0048507 A1 | 3/2011 | Livsey et al. | |
| 2011/0058337 A1 | 3/2011 | Han et al. | |
| 2011/0061326 A1 | 3/2011 | Jenkins | |
| 2011/0100436 A1 | 5/2011 | Cleereman et al. | |
| 2011/0104488 A1 | 5/2011 | Muessig et al. | |
| 2011/0132427 A1* | 6/2011 | Kalkanoglu | H02S 40/34 136/244 |
| 2011/0168238 A1 | 7/2011 | Metin et al. | |
| 2011/0239555 A1 | 10/2011 | Cook et al. | |
| 2011/0302859 A1 | 12/2011 | Crasnianski | |
| 2011/0314753 A1 | 12/2011 | Farmer et al. | |
| 2012/0034799 A1 | 2/2012 | Hunt | |
| 2012/0060434 A1 | 3/2012 | Jacobs | |
| 2012/0060902 A1 | 3/2012 | Drake | |
| 2012/0085392 A1 | 4/2012 | Albert et al. | |
| 2012/0137600 A1 | 6/2012 | Jenkins | |
| 2012/0176077 A1 | 7/2012 | Oh et al. | |
| 2012/0212065 A1 | 8/2012 | Cheng et al. | |
| 2012/0233940 A1 | 9/2012 | Perkins et al. | |
| 2012/0240490 A1 | 9/2012 | Gangemi | |
| 2012/0260977 A1 | 10/2012 | Stancel | |
| 2012/0266942 A1 | 10/2012 | Komatsu et al. | |
| 2012/0279150 A1 | 11/2012 | Pislkak et al. | |
| 2012/0282437 A1 | 11/2012 | Clark et al. | |
| 2012/0291848 A1 | 11/2012 | Sherman et al. | |
| 2013/0008499 A1 | 1/2013 | Verger et al. | |
| 2013/0014455 A1 | 1/2013 | Grieco | |
| 2013/0118558 A1 | 5/2013 | Sherman | |
| 2013/0193769 A1 | 8/2013 | Mehta et al. | |
| 2013/0247988 A1 | 9/2013 | Reese et al. | |
| 2013/0284267 A1 | 10/2013 | Plug et al. | |
| 2013/0306137 A1 | 11/2013 | Ko | |
| 2014/0090697 A1 | 4/2014 | Rodrigues et al. | |
| 2014/0150843 A1 | 6/2014 | Pearce et al. | |
| 2014/0173997 A1 | 6/2014 | Jenkins | |
| 2014/0179220 A1 | 6/2014 | Railkar et al. | |
| 2014/0182222 A1 | 7/2014 | Kalkanoglu et al. | |
| 2014/0208675 A1 | 7/2014 | Beerer et al. | |
| 2014/0254776 A1 | 9/2014 | O'Connor et al. | |
| 2014/0266289 A1 | 9/2014 | Della Sera et al. | |
| 2014/0311556 A1 | 10/2014 | Feng et al. | |
| 2014/0352760 A1 | 12/2014 | Haynes et al. | |
| 2014/0366464 A1 | 12/2014 | Rodrigues et al. | |
| 2015/0089895 A1 | 4/2015 | Leitch | |
| 2015/0162459 A1 | 6/2015 | Lu et al. | |
| 2015/0340516 A1 | 11/2015 | Kim et al. | |
| 2015/0349173 A1 | 12/2015 | Morad et al. | |
| 2016/0105144 A1 | 4/2016 | Haynes et al. | |
| 2016/0142008 A1 | 5/2016 | Lopez et al. | |
| 2016/0254776 A1 | 9/2016 | Rodrigues et al. | |
| 2016/0276508 A1 | 9/2016 | Huang et al. | |
| 2016/0359451 A1 | 12/2016 | Mao et al. | |
| 2017/0159292 A1 | 6/2017 | Chihlas et al. | |
| 2017/0179319 A1 | 6/2017 | Yamashita et al. | |
| 2017/0179726 A1 | 6/2017 | Garrity et al. | |
| 2017/0237390 A1 | 8/2017 | Hudson et al. | |
| 2017/0331415 A1 | 11/2017 | Koppi et al. | |
| 2018/0094438 A1 | 4/2018 | Wu et al. | |
| 2018/0097472 A1 | 4/2018 | Anderson et al. | |
| 2018/0115275 A1 | 4/2018 | Flanigan et al. | |
| 2018/0254738 A1 | 9/2018 | Yang et al. | |
| 2018/0294765 A1 | 10/2018 | Friedrich et al. | |
| 2018/0351502 A1 | 12/2018 | Almy et al. | |
| 2018/0367089 A1 | 12/2018 | Stutterheim et al. | |
| 2019/0030867 A1 | 1/2019 | Sun et al. | |
| 2019/0081436 A1 | 3/2019 | Onodi et al. | |
| 2019/0123679 A1 | 4/2019 | Rodrigues et al. | |
| 2019/0253022 A1 | 8/2019 | Hardar et al. | |
| 2019/0305717 A1 | 10/2019 | Allen et al. | |
| 2020/0109320 A1 | 4/2020 | Jiang | |
| 2020/0144958 A1 | 5/2020 | Rodrigues et al. | |
| 2020/0220819 A1 | 7/2020 | Vu et al. | |
| 2020/0224419 A1 | 7/2020 | Boss et al. | |
| 2020/0343397 A1 | 10/2020 | Hem-Jensen | |
| 2021/0083619 A1 | 3/2021 | Hegedus | |
| 2021/0115223 A1 | 4/2021 | Bonekamp et al. | |
| 2021/0159353 A1 | 5/2021 | Li et al. | |

(56) References Cited

U.S. PATENT DOCUMENTS

| | | | |
|---|---|---|---|
| 2021/0301536 A1 | 9/2021 | Baggs et al. | |
| 2021/0343886 A1 | 11/2021 | Sharenko et al. | |
| 2022/0149213 A1 | 5/2022 | Mensink et al. | |

FOREIGN PATENT DOCUMENTS

| | | | | |
|---|---|---|---|---|
| CN | 202797032 U | 3/2013 | | |
| CN | 217150978 U | 8/2022 | | |
| DE | 1958248 A1 | 11/1971 | | |
| EP | 1039361 A1 | 9/2000 | | |
| EP | 1429394 A2 * | 6/2004 | ........... | H01L 27/142 |
| EP | 1837162 A1 | 9/2007 | | |
| EP | 1774372 A1 | 7/2011 | | |
| EP | 2446481 A2 | 5/2012 | | |
| EP | 2533302 A2 * | 12/2012 | ......... | H01L 31/0201 |
| EP | 2784241 A1 | 10/2014 | | |
| EP | 3772175 A1 | 2/2021 | | |
| JP | 10046767 A | 2/1998 | | |
| JP | 2002-106151 A | 4/2002 | | |
| JP | 2001-098703 A | 10/2002 | | |
| JP | 2017-027735 A | 2/2017 | | |
| JP | 2018053707 A | 4/2018 | | |
| KR | 20090084060 A | 8/2009 | | |
| KR | 10-1348283 B1 | 1/2014 | | |
| KR | 10-2019-0000367 A | 1/2019 | | |
| KR | 10-2253483 B1 | 5/2021 | | |
| NL | 2026856 B1 | 6/2022 | | |
| WO | 2010/151777 A2 | 12/2010 | | |
| WO | 2011/049944 A1 | 4/2011 | | |
| WO | 2015/133632 A1 | 9/2015 | | |
| WO | 2018/000589 A1 | 1/2018 | | |
| WO | 2019/201416 A1 | 10/2019 | | |
| WO | 2020-159358 A1 | 8/2020 | | |
| WO | 2021-247098 A1 | 12/2021 | | |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing. <<https://www.owenscorning.com/en-us/roofing/tools/how-roofing-underlayment-helps-protect-your-home>> retrieved. Nov. 1, 2021.

* cited by examiner

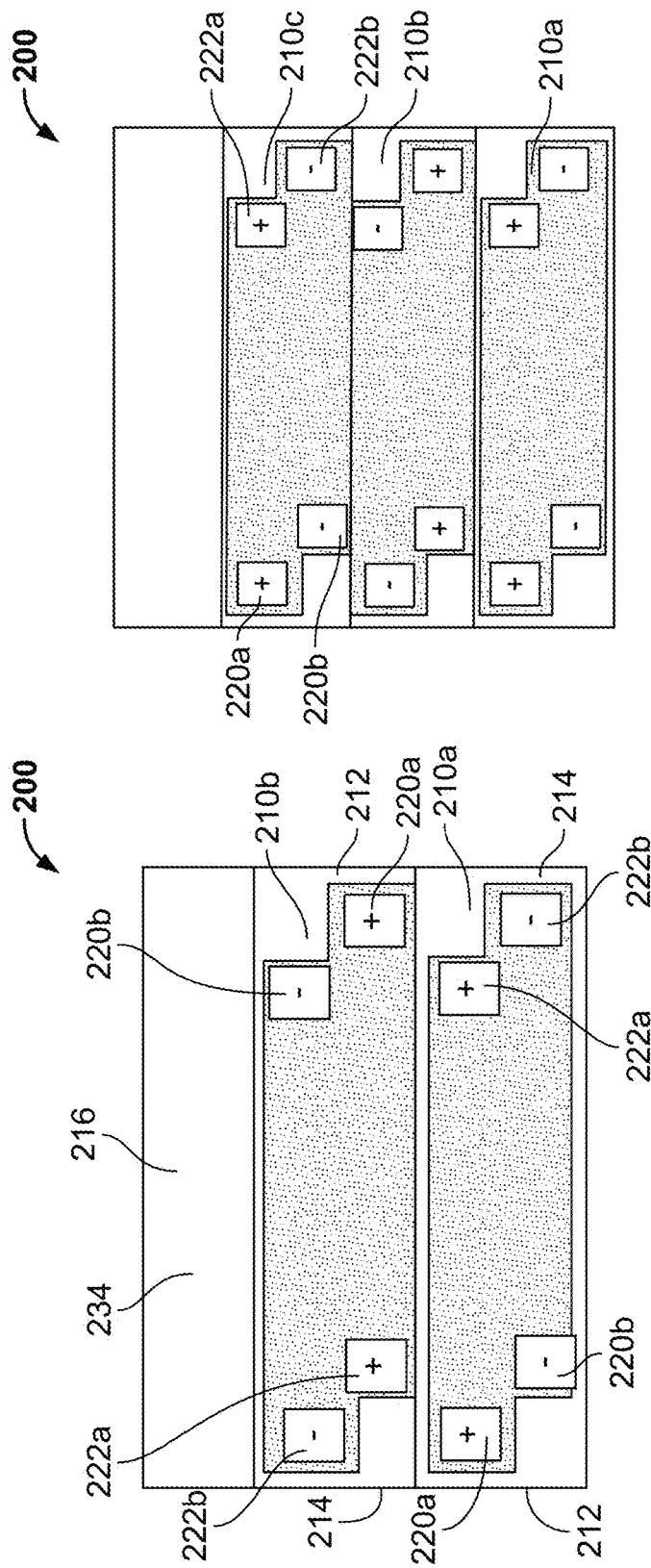
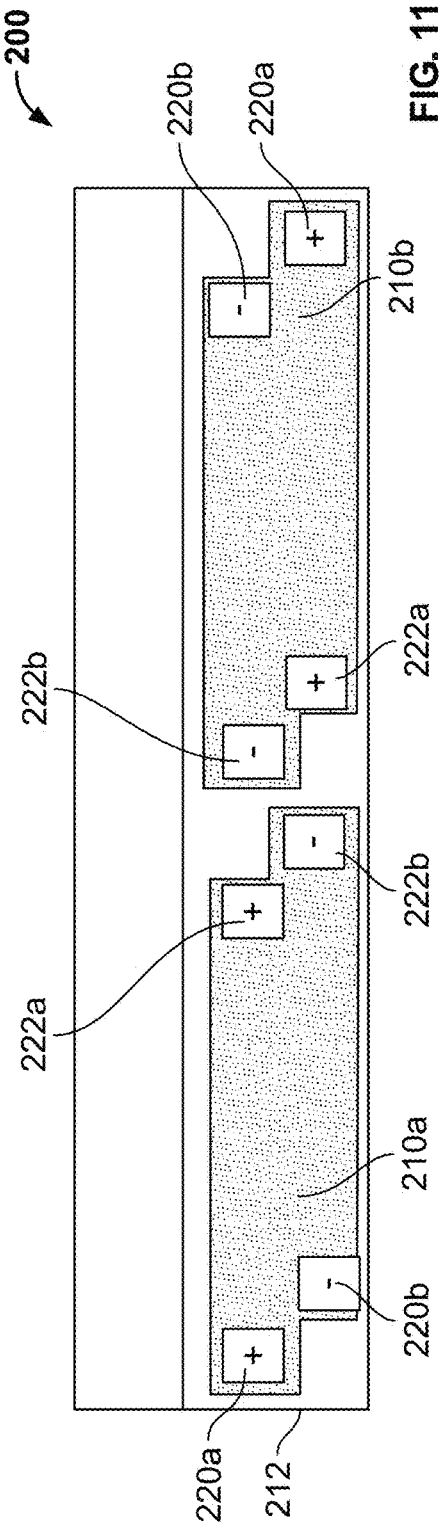
FIG. 9
FIG. 10
FIG. 11

PHOTOVOLTAIC SHINGLES WITH MULTI-MODULE POWER ELECTRONICS

CROSS-REFERENCE TO RELATED APPLICATION

This application is a continuation of U.S. Non-Provisional patent application Ser. No. 18/584,881, filed Feb. 22, 2024, which is a Section 111(a) application relating to and claiming the benefit of commonly owned, U.S. Provisional Patent Application Ser. No. 63/486,574, filed Feb. 23, 2023, entitled "PHOTOVOLTAIC SHINGLES WITH MULTI-MODULE POWER ELECTRONICS," the contents of each of which are incorporated herein by reference in its entirety.

FIELD OF THE INVENTION

The present invention relates to photovoltaic shingles and, more particularly, photovoltaic shingles with multi-module power electronics.

BACKGROUND

Photovoltaic systems are installed on building roofs to generate electricity.

SUMMARY

In some embodiments, a system includes a plurality of building integrated photovoltaic modules installed on a roof deck, wherein the plurality of building integrated photovoltaic modules is arranged in an array on the roof deck, wherein the plurality of building integrated photovoltaic modules includes a first building integrated photovoltaic module and a second building integrated photovoltaic module, wherein the first building integrated photovoltaic module is vertically adjacent to the second building integrated photovoltaic module, wherein each of the plurality of building integrated photovoltaic modules includes a plurality of solar cells arranged in at least one row, and a power electronics unit, wherein the power electronics unit is adjacent to a first end of one of the at least one row of the plurality of solar cells, wherein the power electronics unit is electrically connected to the plurality of solar cells, and wherein the power electronics unit of the first building integrated photovoltaic module is electrically connected to the power electronics unit of the second building integrated photovoltaic module.

In some embodiments, the power electronics unit is horizontally adjacent to the first end of the one of the at least one row of the plurality of solar cells. In some embodiments, the plurality of building integrated photovoltaic modules is a plurality of solar shingles. In some embodiments, the at least one row includes a plurality of rows, wherein the plurality of rows includes a first row and a second row above the first row, wherein each of the plurality of building integrated photovoltaic modules includes a first electrical connector proximate to the first end of the first row and electrically connected to the first row of the plurality of solar cells, and a second electrical connector proximate to a first end of the second row and electrically connected to the second row of the plurality of solar cells, and wherein the power electronics unit is connected to the first electrical connector and the second electrical connector.

In some embodiments, the power electronics unit includes a first terminal and a second terminal, wherein the first terminal of the power electronics unit of the first building integrated photovoltaic module is electrically connected to the second electrical connector of the first building integrated photovoltaic module, and wherein the first terminal of the power electronics unit of the second building integrated photovoltaic module is electrically connected to the second electrical connector of the second building integrated photovoltaic module. In some embodiments, each of the first electrical connector and the second electrical connector includes a first connector and a second connector, wherein the first terminal of the power electronics unit of the first building integrated photovoltaic module is electrically connected to the first connector of the second electrical connector of the first building integrated photovoltaic module, and wherein the first terminal of the power electronics unit of the second building integrated photovoltaic module is electrically connected to the first connector of the second electrical connector of the second building integrated photovoltaic module.

In some embodiments, the power electronics unit of the first building integrated photovoltaic module is mechanically connected to the second electrical connector of the first building integrated photovoltaic module, and wherein the power electronics unit of the second building integrated photovoltaic module is mechanically connected to the second electrical connector of the second building integrated photovoltaic module.

In some embodiments, the first terminal of the power electronics unit of the first building integrated photovoltaic module is mechanically connected to the first connector of the second electrical connector of the first building integrated photovoltaic module. In some embodiments, the first terminal of the power electronics unit of the second building integrated photovoltaic module is mechanically connected to the first connector of the second electrical connector of the second building integrated photovoltaic module. In some embodiments, the second terminal of the power electronics unit of the first building integrated photovoltaic module is electrically connected to the second connector of the first electrical connector of the first building integrated photovoltaic module by a first electrical cable. In some embodiments, the second connector of the second electrical connector of the first building integrated photovoltaic module is electrically connected to the first connector of the first electrical connector of the first building integrated photovoltaic module by a second electrical cable. In some embodiments, the second terminal of the power electronics unit of the second building integrated photovoltaic module is electrically connected to the second connector of the first electrical connector of the second building integrated photovoltaic module by a third electrical cable. In some embodiments, the second connector of the second electrical connector of the second building integrated photovoltaic module is electrically connected to the first connector of the first electrical connector of the second building integrated photovoltaic module by a fourth electrical cable. In some embodiments, the power electronics unit includes a third terminal and a fourth terminal, wherein the third terminal of the power electronics unit of the first building integrated photovoltaic module is electrically connected to the fourth terminal of the power electronics unit of the second building integrated photovoltaic module by a fifth electrical cable.

In some embodiments, the system further includes a third electrical connector installed on the roof deck, wherein each of the power electronics unit of the first building integrated photovoltaic module and the power electronics unit of the second building integrated photovoltaic module is electrically connected to the third electrical connector. In some embodiments, the third electrical connector includes a first connector and a second connector, wherein the third terminal of the power electronics unit of the second building integrated photovoltaic module is electrically connected to the first connector of the third electrical connector by a sixth electrical cable. In some embodiments, the fourth terminal of the power electronics unit of the first building integrated photovoltaic module is electrically connected to the second connector of the third electrical connector by a seventh electrical cable.

In some embodiments, the power electronics unit includes a housing and power electronics within the housing. In some embodiments, the power electronics includes an optimizer, a bypass diode, system monitoring electronic components, a rapid shutdown device, an electronic communication component, or combinations thereof.

In some embodiments, each of the plurality of rows includes a second end opposite the first end of the row, wherein each of the first building integrated photovoltaic module and the second building integrated photovoltaic module includes a first negative electrical terminal located at the first end of the first row thereof, a first positive electrical terminal located at the second end of the second row thereof, a second positive electrical terminal located at the first end of the second row thereof, and a second negative terminal located at the second end of the second row thereof.

In some embodiments, the plurality of building integrated photovoltaic modules is installed on the roof deck by a plurality of fasteners. In some embodiments, the plurality of building integrated photovoltaic modules includes a third building integrated photovoltaic module, wherein the third building integrated photovoltaic module is horizontally adjacent to the first building integrated photovoltaic module. In some embodiments, the plurality of building integrated photovoltaic modules includes a fourth building integrated photovoltaic module, wherein the fourth building integrated photovoltaic module is horizontally adjacent to the second building integrated photovoltaic module. In some embodiments, the fourth building integrated photovoltaic module is vertically adjacent to the third building integrated photovoltaic module. In some embodiments, the power electronics unit of the third building integrated photovoltaic module is electrically connected to the power electronics unit of the fourth building integrated photovoltaic module.

In some embodiments, a system includes a plurality of building integrated photovoltaic modules installed on a roof deck, wherein the plurality of building integrated photovoltaic modules is arranged in an array on the roof deck, wherein the plurality of building integrated photovoltaic modules includes a first building integrated photovoltaic module and a second building integrated photovoltaic module, wherein the first building integrated photovoltaic module is vertically adjacent to the second building integrated photovoltaic module, wherein each of the plurality of building integrated photovoltaic modules includes a plurality of solar cells arranged in at least one row; a first power electronics unit, wherein the first power electronics unit is adjacent to a first end of one of the at least one row of the plurality of solar cells of the first building integrated photovoltaic module, wherein the first power electronics unit is electrically connected to the plurality of solar cells of the first building integrated photovoltaic module; and a second power electronics unit, wherein the second power electronics unit is adjacent to a first end of one of the at least one row of the plurality of solar cells of the second building integrated photovoltaic module, and wherein the first power electronics unit is electrically connected to the second power electronics unit.

In some embodiments, a method includes obtaining a plurality of building integrated photovoltaic modules, wherein each of the plurality of building integrated photovoltaic modules includes a plurality of solar cells arranged in at least one row, and a power electronics unit, wherein the power electronics unit is adjacent to a first end of one of the at least one row of the plurality of solar cells, wherein the power electronics unit is electrically connected to the plurality of solar cells; and installing at least a first building integrated photovoltaic module and a second building integrated photovoltaic module on a roof deck, wherein the first building integrated photovoltaic module is vertically adjacent to the second building integrated photovoltaic module, and wherein the power electronics unit of the first building integrated photovoltaic module is electrically connected to the power electronics unit of the second building integrated photovoltaic module.

In some embodiments, the method further includes installing a third building integrated photovoltaic module and a fourth building integrated photovoltaic module on the roof deck, wherein the third building integrated photovoltaic module is horizontally adjacent to the first building integrated photovoltaic module, and wherein the fourth building integrated photovoltaic module is horizontally adjacent to the second building integrated photovoltaic module and vertically adjacent to the third building integrated photovoltaic module. In some embodiments, the plurality of building integrated photovoltaic modules is a plurality of solar shingles. In some embodiments, the plurality of building integrated photovoltaic modules is installed on the roof deck by a plurality of fasteners.

BRIEF DESCRIPTION OF THE DRAWINGS

FIGS. 9 through 11 are schematic, top plan views of some embodiments of photovoltaic shingles.

DETAILED DESCRIPTION

Figure 1A:
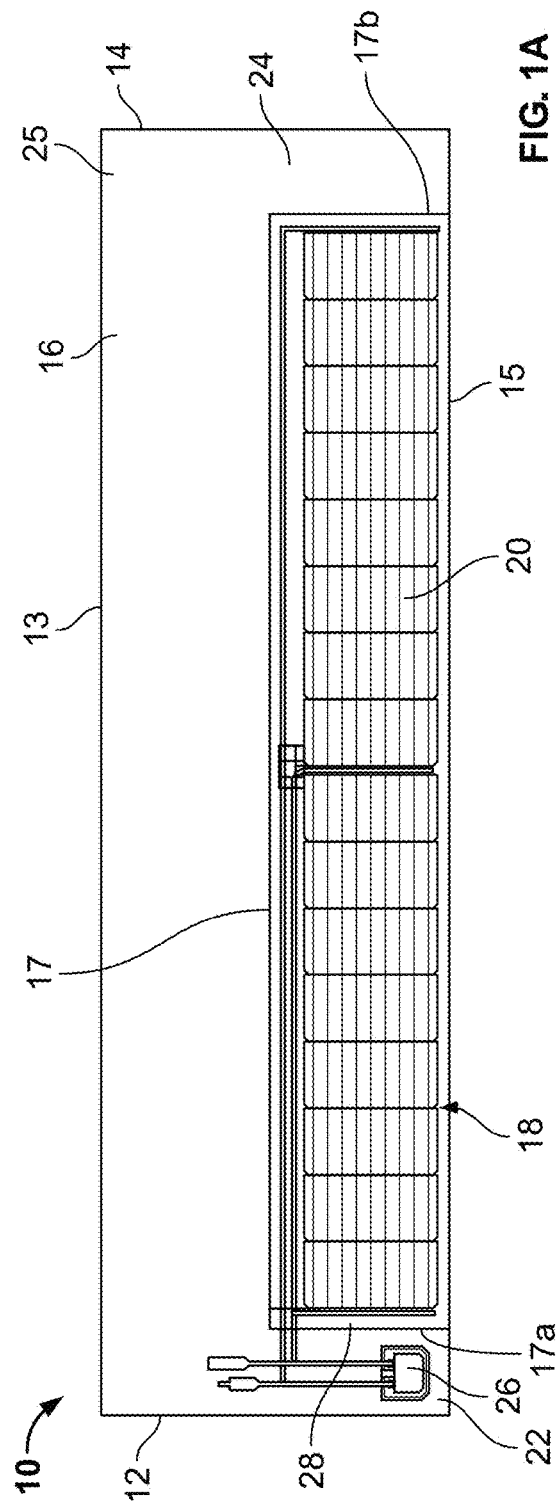
FIGS. 1A and 1B are a top plan view and a side elevational view, respectively, of some embodiments of a photovoltaic shingle.
Figure 1B:
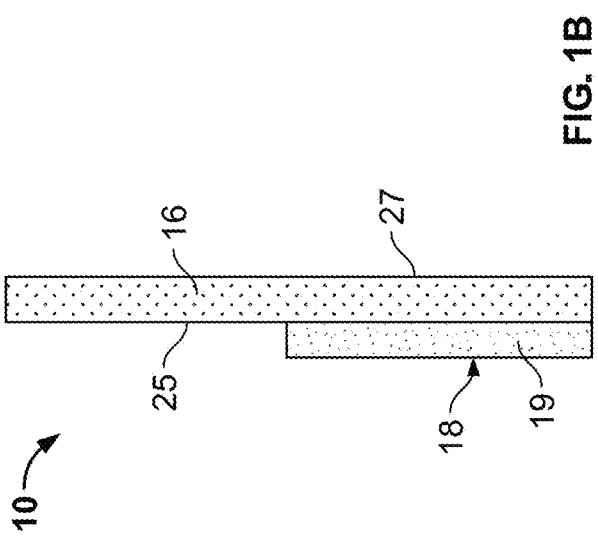

Referring to FIGS. 1A and 1B, in some embodiments, a photovoltaic shingle 10 includes a first end 12, a second end 14 opposite the first end 12, a first edge 13 extending from the first end 12 to the second end 14, and a second edge 15 opposite the first edge 13 and extending from the first end 12 to the second end 14. In some embodiments, the photovoltaic shingle 10 includes a headlap portion 16. In some embodiments, the headlap portion 16 extends from the first end 12 to the second end 14 and from the first edge 13 to a first location 17 between the first edge 13 and the second edge 15. In some embodiments, the photovoltaic shingle 10 includes a reveal portion 18. In some embodiments, the reveal portion 18 includes a photovoltaic layer 19. In some embodiments, the photovoltaic layer 19 includes at least one solar cell 20. In some embodiments, the photovoltaic shingle 10 includes a first side lap portion 22 located at the first end 12. In some embodiments, the first side lap portion 22 includes a width extending from the first end 12 to a second location 17*a* between the first end 12 and the second end 14. In some embodiments, the first side lap portion 22 includes a length extending from the first location 17 to the second edge 15. In some embodiments, the photovoltaic shingle 10 includes a second side lap portion 24 located at the second end 14. In some embodiments, the second side lap portion 24 includes a width extending from the second end 14 to a third location 17*b* between the first end 12 and the second end 14. In some embodiments, the second side lap portion 24 includes a length extending from the first location 17 to the second edge 15. In some embodiments, the photovoltaic shingle 10 includes an outer surface 25 and an inner surface 27 opposite the outer surface 25. In some embodiments, the reveal portion 18 extends from the first side lap portion 22 to the second side lap portion 24 and from the second edge 15 to the first location 17. In some embodiments, the photovoltaic shingle 10 is configured to be installed on a building structure. In some embodiments, the photovoltaic shingle 10 is configured to be installed on a roof deck. In some embodiments, at least one junction box 26 is located on the first side lap portion 22. In some embodiments, the at least one junction box 26 includes a plurality of the junction boxes 26. In certain embodiments, other electronic and electrical components may be attached to the first side lap portion 22. In some embodiments, non-limiting examples of such electronic and electrical components include an electrical connector, a rapid shutdown device, an optimizer, and an inverter. In some embodiments, the photovoltaic shingle 10 includes a structure, composition, components, and/or function similar to those of one or more embodiments of the photovoltaic shingles disclosed in in PCT International Patent Publication No. WO 2022/051593, Application No. PCT/US2021/049017, published Mar. 10, 2022, entitled "Building Integrated Photovoltaic System," owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

In some embodiments, the at least one solar cell 20 includes a plurality of the solar cells 20. In some embodiments, the plurality of solar cells 20 includes two solar cells. In some embodiments, the plurality of solar cells 20 includes three solar cells. In some embodiments, the plurality of solar cells 20 includes four solar cells. In some embodiments, the plurality of solar cells 20 includes five solar cells. In some embodiments, the plurality of solar cells 20 includes six solar cells. In some embodiments, the plurality of solar cells 20 includes seven solar cells. In some embodiments, the plurality of solar cells 20 includes eight solar cells. In some embodiments, the plurality of solar cells 20 includes nine solar cells. In some embodiments, the plurality of solar cells 20 includes ten solar cells. In some embodiments, the plurality of solar cells 20 includes eleven solar cells. In some embodiments, the plurality of solar cells 20 includes twelve solar cells.

In some embodiments, the plurality of solar cells 20 includes thirteen solar cells. In some embodiments, the plurality of solar cells 20 includes fourteen solar cells. In some embodiments, the plurality of solar cells 20 includes fifteen solar cells. In some embodiments, the plurality of solar cells 20 includes sixteen solar cells. In some embodiments, the plurality of solar cells 20 includes more than sixteen solar cells.

In some embodiments, the plurality of solar cells 20 is arranged in one row (i.e., one reveal). In another embodiment, the plurality of solar cells 20 is arranged in two rows (i.e., two reveals). In another embodiment, the plurality of solar cells 20 is arranged in three rows (i.e., three reveals). In another embodiment, the plurality of solar cells 20 is arranged in four rows (i.e., four reveals). In another embodiment, the plurality of solar cells 20 is arranged in five rows (i.e., five reveals). In another embodiment, the plurality of solar cells 20 is arranged in six rows (i.e., six reveals). In other embodiments, the plurality of solar cells 20 is arranged in more than six rows. In some embodiments, each of the rows of the plurality of solar cells 20 includes a first end 28 located proximate to the first side lap portion 22.

In some embodiments, a roofing system includes a plurality of the photovoltaic shingles 10 installed on a roof deck. In some embodiments, the roof deck is a steep slope roof deck. As defined herein, a "steep slope roof deck" is any roof deck that is disposed on a roof having a pitch of Y/X, where Y and X are in a ratio of 4:12 to 12:18, where Y corresponds to the "rise" of the roof, and where X corresponds to the "run" of the roof.

In some embodiments, the plurality of photovoltaic shingles 10 is installed directly to the roof deck. In some embodiments, each of the plurality of photovoltaic shingles 10 is installed on the roof deck by a plurality of fasteners. In some embodiments, the plurality of fasteners is installed through the headlap portion 16. In some embodiments, the plurality of fasteners includes a plurality of nails. In some embodiments, the plurality of fasteners includes a plurality of rivets. In some embodiments, the plurality of fasteners includes a plurality of screws. In some embodiments, the plurality of fasteners includes a plurality of staples.

In some embodiments, each of the plurality of photovoltaic shingles 10 is installed on the roof deck by an adhesive. In some embodiments, the adhesive is adhered directly to the roof deck. In some embodiments, the adhesive is adhered to an underlayment. In some embodiments, the underlayment is adhered directly to the roof deck. In some embodiments, the adhesive is located on a rear surface of the photovoltaic shingle 10. In some embodiments, the adhesive includes at least one adhesive strip. In some embodiments, the adhesive includes a plurality of adhesive strips. In some embodiments, the plurality of adhesive strips is arranged intermittently. In some embodiments, the adhesive is located proximate to one edge of the photovoltaic shingle 10. In some embodiments, the adhesive is a peel and stick film sheet. In some embodiments, the peel and stick film sheet includes at least one sheet of film removably attached to the rear surface. In some embodiments, the peel and stick film sheet is composed of EverGuard Freedom HW peel and stick membrane manufactured by GAF. In some embodiments, the adhesive includes polyvinyl butyrate, acrylic, silicone, or polycarbonate. In some embodiments, the adhesive includes pressure sensitive adhesives.

In some embodiments, a first photovoltaic shingle 10 is vertically adjacent to a second photovoltaic shingle 10. In some embodiments, the first photovoltaic shingle 10 overlays at least a part of the headlap portion 16 of the second photovoltaic shingle 10.

Figure 2:
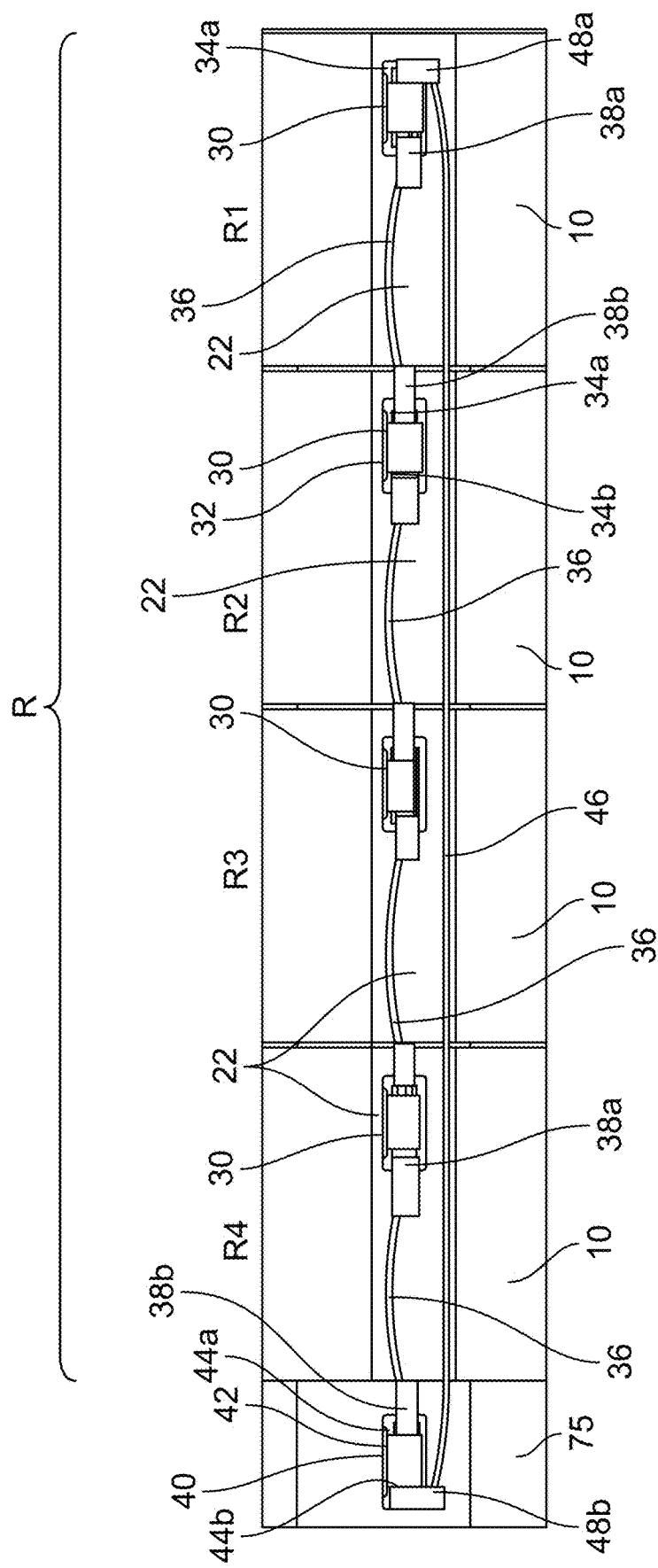
FIG. 2 is a top plan view of some embodiments of a portion of a roofing system including photovoltaic shingles.

Referring to FIG. 2, in some embodiments, a roofing system includes a plurality of photovoltaic shingles 10 installed on a roof deck 75 in a plurality of rows R. In some embodiments, each of a plurality of the photovoltaic shingles 10 includes a first electrical connector 30. In some embodiments, the first electrical connector 30 is located on the first side lap portion 22. In some embodiments, the first electrical connector 30 is located on the first side lap portion 22 proximate to the first end 28 of the row of solar cells 20. In some embodiments, the first electrical connector 30 is at least partially embedded within the side lap portion 22. In some embodiments, the first electrical connector 30 is attached to an upper surface of the side lap portion 22. In some embodiments, the first electrical connector 30 is attached to the upper surface of the side lap portion 22 by an adhesive. In some embodiments, the first electrical connector 30 is attached to the upper surface of the side lap portion 22 by welding. In some embodiments, the first electrical connector 30 is attached to the upper surface of the side lap portion 22 by heat welding. In some embodiments, the first electrical connector 30 is attached to the upper surface of the side lap portion 22 by ultrasonic welding. In some embodiments, the first electrical connector 30 is attached to the upper surface of the side lap portion 22 by at least one fastener. In some embodiments, the first electrical connector 30 is removably attached to the upper surface of the side lap portion 22.

In some embodiments, the first electrical connector 30 includes a structure, composition, components, and/or function similar to those of one or more embodiments of the electrical connectors disclosed in U.S. Patent Application Publication No. 2022/0029037 to Nguyen et al., published Jan. 27, 2022 and entitled "Photovoltaic Systems" and U.S. Patent Application Publication No. 2022/0311377 to Bunea et al., published Sep. 29, 2022 and entitled "Electrical Components for Photovoltaic Systems," the contents of each of which are incorporated by reference herein in its entirety.

In some embodiments, the first electrical connector 30 has a thickness of 1 mm to 10 mm. In some embodiments, the first electrical connector 30 has a thickness of 1 mm to 9 mm. In some embodiments, the first electrical connector 30 has a thickness of 1 mm to 8 mm. In some embodiments, the first electrical connector 30 has a thickness of 1 mm to 7 mm. In some embodiments, the first electrical connector 30 has a thickness of 1 mm to 6 mm. In some embodiments, the first electrical connector 30 has a thickness of 1 mm to 5 mm. In some embodiments, the first electrical connector 30 has a thickness of 1 mm to 4 mm. In some embodiments, the first electrical connector 30 has a thickness of 1 mm to 3 mm. In some embodiments, the first electrical connector 30 has a thickness of 1 mm to 2 mm. In some embodiments, the first electrical connector 30 has a thickness of 2 mm to 10 mm. In some embodiments, the first electrical connector 30 has a thickness of 2 mm to 9 mm. In some embodiments, the first electrical connector 30 has a thickness of 2 mm to 8 mm. In some embodiments, the first electrical connector 30 has a thickness of 2 mm to 7 mm. In some embodiments, the first electrical connector 30 has a thickness of 2 mm to 6 mm. In some embodiments, the first electrical connector 30 has a thickness of 2 mm to 5 mm. In some embodiments, the first electrical connector 30 has a thickness of 2 mm to 4 mm. In some embodiments, the first electrical connector 30 has a thickness of 2 mm to 3 mm. In some embodiments, the first electrical connector 30 has a thickness of 3 mm to 10 mm. In some embodiments, the first electrical connector 30 has a thickness of 3 mm to 9 mm. In some embodiments, the first electrical connector 30 has a thickness of 3 mm to 8 mm. In some embodiments, the first electrical connector 30 has a thickness of 3 mm to 7 mm. In some embodiments, the first electrical connector 30 has a thickness of 3 mm to 6 mm. In some embodiments, the first electrical connector 30 has a thickness of 3 mm to 5 mm. In some embodiments, the first electrical connector 30 has a thickness of 3 mm to 4 mm. In some embodiments, the first electrical connector 30 has a thickness of 4 mm to 10 mm. In some embodiments, the first electrical connector 30 has a thickness of 4 mm to 9 mm. In some embodiments, the first electrical connector 30 has a thickness of 4 mm to 8 mm. In some embodiments, the first electrical connector 30 has a thickness of 4 mm to 7 mm. In some embodiments, the first electrical connector 30 has a thickness of 4 mm to 6 mm. In some embodiments, the first electrical connector 30 has a thickness of 4 mm to 5 mm. In some embodiments, the first electrical connector 30 has a thickness of 5 mm to 10 mm. In some embodiments, the first electrical connector 30 has a thickness of 5 mm to 9 mm. In some embodiments, the first electrical connector 30 has a thickness of 5 mm to 8 mm. In some embodiments, the first electrical connector 30 has a thickness of 5 mm to 7 mm. In some embodiments, the first electrical connector 30 has a thickness of 5 mm to 6 mm.

In some embodiments, the first electrical connector 30 has a thickness of 6 mm to 10 mm. In some embodiments, the first electrical connector 30 has a thickness of 6 mm to 9 mm. In some embodiments, the first electrical connector 30 has a thickness of 6 mm to 8 mm. In some embodiments, the first electrical connector 30 has a thickness of 6 mm to 7 mm. In some embodiments, the first electrical connector 30 has a thickness of 7 mm to 10 mm. In some embodiments, the first electrical connector 30 has a thickness of 7 mm to 9 mm. In some embodiments, the first electrical connector 30 has a thickness of 7 mm to 8 mm. In some embodiments, the first electrical connector 30 has a thickness of 8 mm to 10 mm. In some embodiments, the first electrical connector 30 has a thickness of 8 mm to 9 mm. In some embodiments, the first electrical connector 30 has a thickness of 9 mm to 10 mm. In some embodiments, the first electrical connector 30 has a thickness of 1 mm. In some embodiments, the first electrical connector 30 has a thickness of 2 mm. In some embodiments, the first electrical connector 30 has a thickness of 3 mm. In some embodiments, the first electrical connector 30 has a thickness of 4 mm. In some embodiments, the first electrical connector 30 has a thickness of 5 mm. In some embodiments, the first electrical connector 30 has a thickness of 6 mm. In some embodiments, the first electrical connector 30 has a thickness of 7 mm. In some embodiments, the first electrical connector 30 has a thickness of 8 mm. In some embodiments, the first electrical connector 30 has a thickness of 9 mm. In some embodiments, the first electrical connector 30 has a thickness of 10 mm.

In some embodiments, the first electrical connector 30 is electrically connected to the plurality of solar cells 20. In some embodiments, the first electrical connector 30 is electrically connected to the plurality of solar cells 20 by electrical bussing. In some embodiments, the electrical bussing is embedded within the photovoltaic shingle 10.

In some embodiments, the first electrical connector 30 includes a housing 32 and a pair of connectors 34a, 34b. In some embodiments, the connectors 34a, 34b extend from the housing 32. In some embodiments, the connectors 34a, 34b are snap-fit connectors. In some embodiments, the connector 34a is spaced apart from the connector 34b. In some embodiments, the connector 34a is located proximate to one end of the housing 32 and the connector 34b is located proximate to an opposite end of the housing 32. In some embodiments, each of the first electrical connectors 30 is electrically connected to one another by a plurality of electrical jumper wires 36 (also referred to as jumper wires, electrical jumper cables, or jumper cables). In some embodiments, the first electrical connectors 30 are electrically connected to one another in series by the plurality of jumper wires 36. In some embodiments, each of the jumper wires 36 includes a first connector 38a at a first end thereof and a second connector 38b at a second, opposite end thereof. In some embodiments, the first connector 38a of a corresponding one of the jumper wires 36 is connected to a corresponding one of the connector 34b of the housing 32 of the first electrical connector 30. In some embodiments, the first connector 38a of a corresponding one of the jumper wires 36 is preconnected to a corresponding one of the connector 34b of the housing 32 of the first electrical connector 30 of the photovoltaic shingle 10 prior to installation on the roof deck 75. In some embodiments, the second connector 38b of a corresponding one of the jumper wires 36 is connected to a corresponding one of the connector 34a of the housing 32 of the first electrical connector 30 of an adjacent lower one of the plurality of photovoltaic shingles 10 in rows R2, R3, R4.

In some embodiments, the system includes a second electrical connector 40. In some embodiments, the second electrical connector 40 is installed on the roof deck 75. In some embodiments, the second electrical connector 40 is located below row R4. In some embodiments, the second electrical connector 40 is proximate to row R4. In some embodiments, the second electrical connector 40 is adjacent row R4. In some embodiments, the second electrical connector 40 includes a housing 42 and a pair of connectors 44a, 44b. In some embodiments, the connectors 44a, 44b extend from the housing 42. In some embodiments, the second electrical connector 40 has a similar structure and/or function of those of the first electrical connector 30. In some embodiments, a return wire 46 electrically connects the first electrical connector 30 of the photovoltaic shingle 10 in the uppermost row R1 with the second electrical connector 40. In some embodiments, the return wire 46 includes a first connector 48a at a first end thereof and a second connector 48b at a second, opposite end thereof. In some embodiments, the connector 48a of the return wire 46 is connected to the connector 34a of the first electrical connector 30 of the photovoltaic shingle 10 in row R1. In some embodiments, the connector 48b of the return wire 46 is connected to the connector 44b of the second electrical connector 40. In some embodiments, the return wire 46 has a length. In some embodiments, the length of the return wire 46 may vary and be selected by an installer of the system, depending upon the number of rows R of the photovoltaic shingles 10 in the column of the array thereof.

Figure 3:
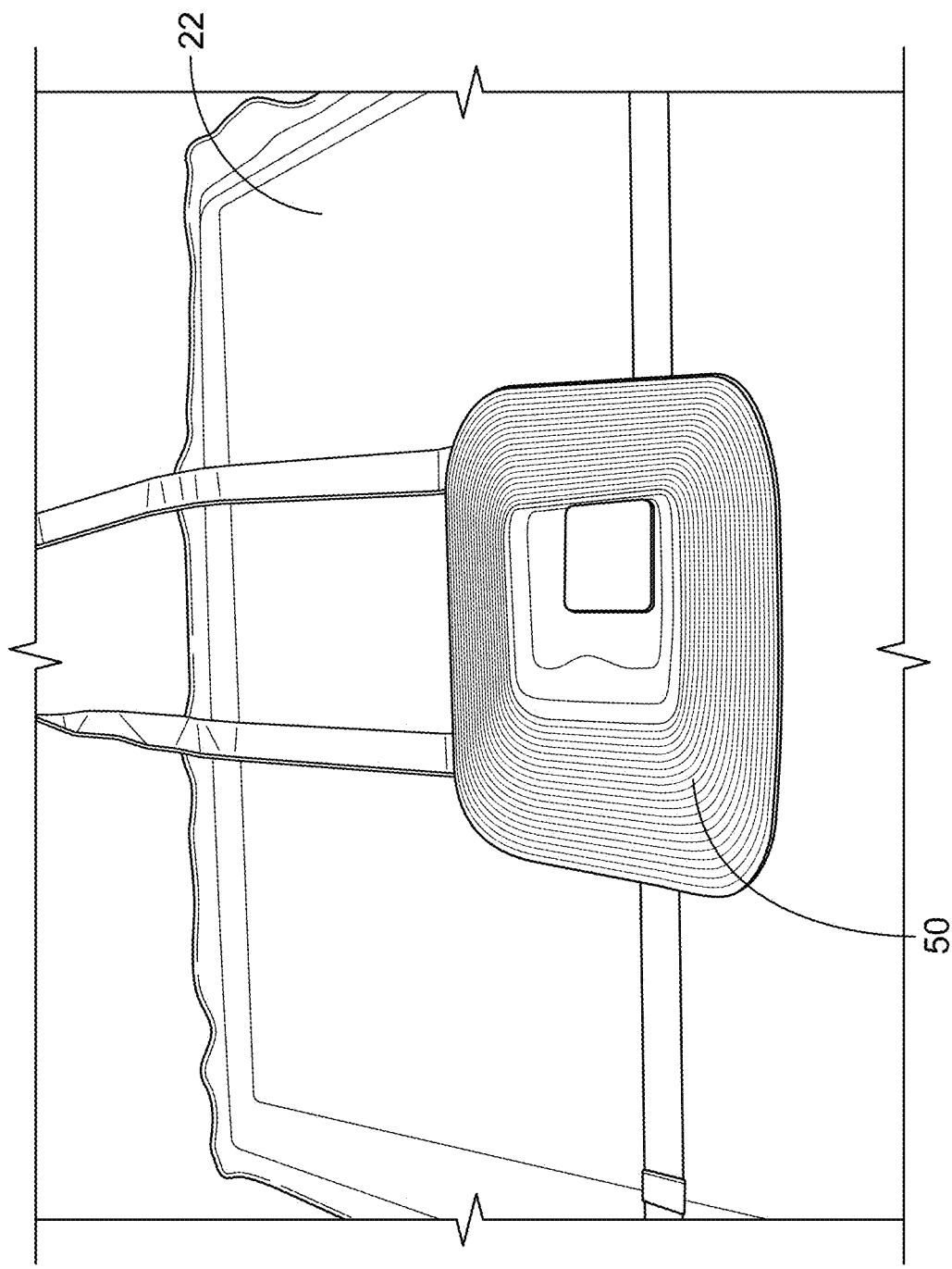
FIG. 3 illustrates some embodiments of a power electronics unit.

Referring to FIG. 3, in some embodiments, the photovoltaic shingle 10 includes a power electronics unit 50. In some embodiments, the power electronics unit 50 is located on the first side lap portion 22. In some embodiments, the power electronics unit 50 is attached to the first side lap portion 22. In some embodiments, the power electronics unit 50 is laminated with the first side lap portion 22. In some embodiments, the power electronics unit 50 is a DC optimizer PCB. In some embodiments, the power electronics unit 50 may be other PCB's having other functionality, such as bypass diodes, system monitoring electronic components, electronic communication components, rapid shutdown devices, or electronic circuitry assemblies performing one or more functionalities such as power optimization, rapid-shutdown, monitoring or communication.

Figure 4:
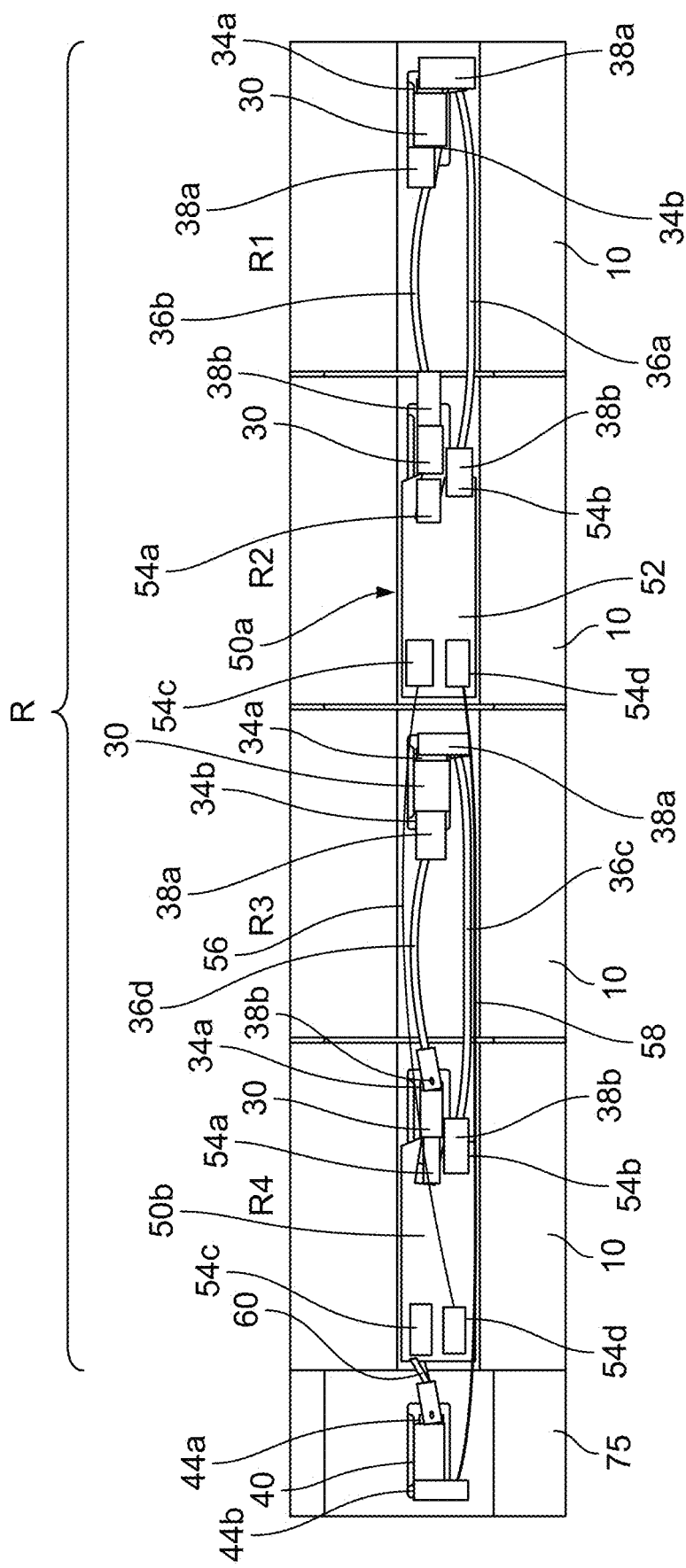
FIG. 4 is a top plan view of some embodiments of a portion of a roofing system including photovoltaic shingles and power electronics units.

Referring to FIG. 4, in some embodiments, the roofing system illustrated in FIG. 3 and described above may be configured to incorporate a plurality of the power electronics units 50. In some embodiments, the power electronics units 50 are installed once every two rows of the photovoltaic shingles 10. In some embodiments, the power electronics units 50 are installed in every row of the photovoltaic shingles 10. In some embodiments, the power electronics units 50 are installed in some of the rows of the photovoltaic shingles 10. In some embodiments, the power electronics unit 50 includes a housing 52. In some embodiments, the housing 52 is composed of plastic. In some embodiments, the housing is composed of metal. In some embodiments, power electronics are sealed within the housing 52. In some embodiments, the power electronics unit 50 includes four terminals 54a, 54b, 54c, 54d. In some embodiments, each of the terminals 54a-d is a bulkhead terminal. In some embodiments, the power electronics unit 50 may include less than four of the terminals 54a-d. In some embodiments, the power electronics unit 50 may include more than four of the terminals 54a-d.

In some embodiments, a first power electronics unit 50a is installed on the photovoltaic shingle 10 in row R2. In some embodiments, the first power electronics unit 50a is connected to the first electrical connector 30 of the photovoltaic shingle 10 in row R2. In some embodiments, the terminal 54a of the first power electronics unit 50a is connected to connector 34a of the first electrical connector 30 of the photovoltaic shingle 10 in row R2. In some embodiments, the second connector 38b of jumper wire 36a is connected to the terminal 54b of the first power electronics unit 50a, while the first connector 38a of the jumper wire 36a is connected to the connector 34a of the first electrical connector 30 of the photovoltaic shingle 10 in row R1. In some embodiments, the second connector 38b of jumper wire 36b is connected to the first connector 34a of the connector 30 in row R2, while the first connector 38a of the jumper wire 36b is connected to the second connector 34b of the connector 30 in row R1.

In some embodiments, a second power electronics unit 50b is installed on the photovoltaic shingle 10 in row R4. In some embodiments, the second power electronics units 50b is connected to the first electrical connector 30 of the photovoltaic shingle 10 in row R4. In some embodiments, the terminal 54a of the second power electronics unit 50b is connected to connector 34a of the first electrical connector 30 of the photovoltaic shingle 10 in row R4. In some embodiments, the second connector 38b of jumper wire 36c is connected to the terminal 54b of the second power electronics unit 50b, while the first connector 38a of the jumper wire 36c is connected to the connector 34a of the first electrical connector 30 of the photovoltaic shingle 10 in row R3. In some embodiments, the second connector 38b of jumper wire 36d is connected to the first connector 34a of the connector 30 in row R4, while the first connector 38a of the jumper wire 36d is connected to the second connector 34b of the connector 30 in row R3.

In some embodiments, the terminal 54c of the first power electronics unit 50a is electrically connected to terminal 54d of the second power electronics unit 50b. In some embodiments, the terminal 54c of the first power electronics unit 50a is electrically connected to terminal 54d of the second power electronics unit 50b by a jumper wire 56. In some embodiments, the terminal 54d of the first power electronics unit 50a is electrically connected to the connector 44b of the second electrical connector 40. In some embodiments, the terminal 54d of the first power electronics unit 50a is electrically connected to the connector 44b of the second electrical connector 40 by a jumper wire 58. In some embodiments, the terminal 54c of the second power electronics unit 50b is electrically connected to the connector 44a of the second electrical connector 40. In some embodiments, the terminal 54c of the second power electronics unit 50b is electrically connected to the connector 44a of the second electrical connector 40 by a jumper wire 60. In some embodiments, the first power electronics unit 50a is electrically connected to the second power electronics unit 50b. In some embodiments, it should be understood that the roofing system may have more or less than four of the rows R1-R4 of the photovoltaic shingles 10, and, therefore, the configuration of the power electronics units 50a-b, the electrical connectors 30, 40 and wires 36a-d, 56, 58, 60 would be modified accordingly.

In some embodiments, any or all of the power electronics units 50a-b, the electrical connectors 30, 40 and wires 36a-d, 56, 58, 60 may be installed by an installer on the roof deck 75. In some embodiments, any or all of the power electronics units 50a-b, the electrical connectors 30, 40 and wires 36a-d, 56, 58, 60 may be prefabricated prior to installation by an installer on the roof deck 75. In some embodiments, at least two of the photovoltaic shingles 10 are mechanically attached to one another and to a common headlap portion using adhesives, bonding or thermal welding processes. In some embodiments, the power electronics units 50a-b and applicable ones of the wires 36a-d, 56, 58, 60 are attached to the photovoltaic shingles 10 that are on the common headlap portion.

Figure 4A:
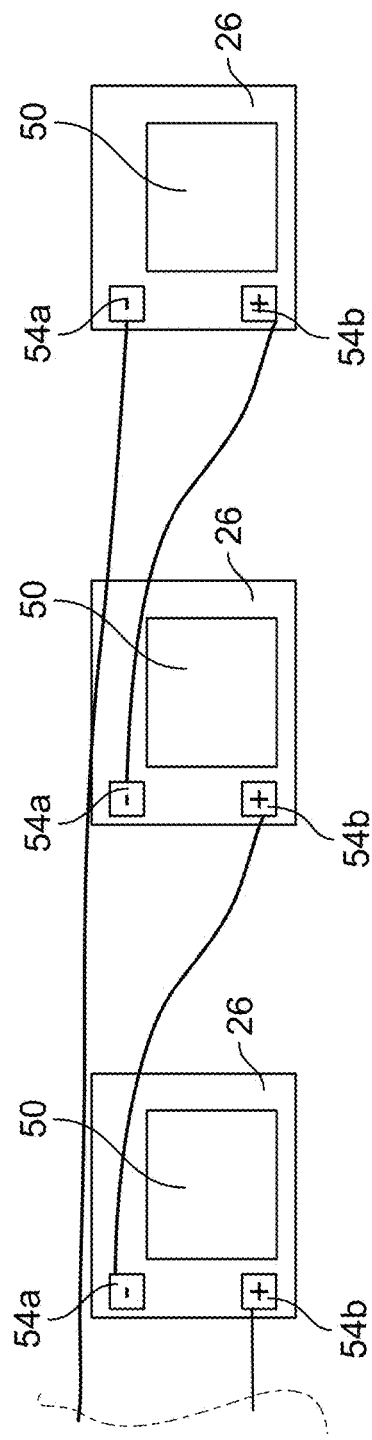
FIGS. 4A through 4C are schematic views of some embodiments of power electronics for photovoltaic shingles.
Figure 4B:
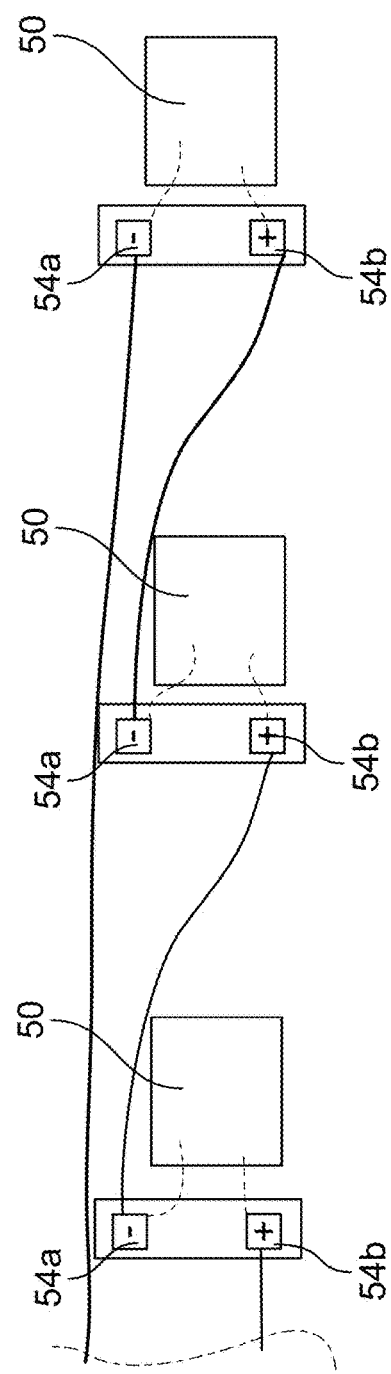
Figure 4C:
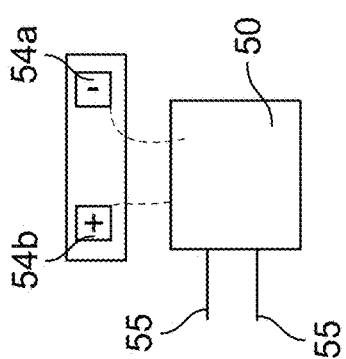

Referring to FIG. 4A, in some embodiments, each of the power electronics units 50 is located within a corresponding one of the junction boxes 26. In some embodiments, the terminals 54a, 54b are located on or in the junction box 26. In some embodiments, at least one of the power electronics units 50 is located within a corresponding one of the junction boxes 26. Referring to FIG. 4B, in some embodiments, each of the power electronics units 50 is separate from the terminals 54a, 54b. Referring to FIG. 4C, in some embodiments, the power electronics unit 50 includes one or more electrical connections 55 to the photovoltaic module 10, the solar cells 20, circuit formation, or other circuitry in between.

Figure 5:
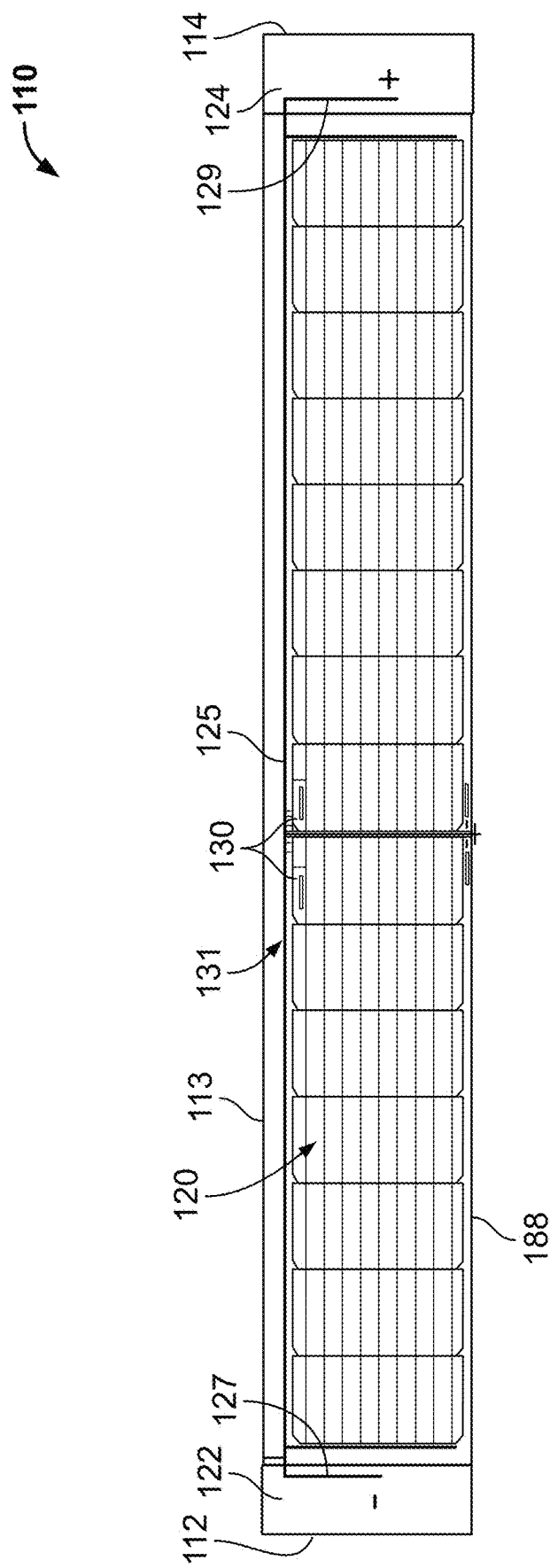
FIG. 5 is a top plan view of some embodiments of a photovoltaic module.

Referring to FIG. 5, in some embodiments, a photovoltaic module 110 includes a first end 112, a second end 114 opposite the first end 112, a reveal portion 118 having a plurality of solar cells 120, a first side lap portion 122 at the first end 112, and a second side lap portion 124 at the second end 114. In some embodiments, the photovoltaic module 110 includes a busbar 125 extending from the first side lap portion 122 to the second side lap portion 124. In some embodiments, the busbar 125 includes a first branch 127 located at the first side lap portion 122. In some embodiments, the busbar 125 includes a second branch 129 located at the second side lap portion 124. In some embodiments, the first branch 127 includes a negative electrical terminal. In some embodiments, the second branch 129 includes a positive electrical terminal. In some embodiments, the first branch 127 includes a positive electrical terminal. In some embodiments, the second branch 129 includes a negative electrical terminal. In some embodiments, the photovoltaic module 110 includes at least one bypass diode 130 electrically connected to the busbar 125. In some embodiments, the at least one bypass diode 130 includes a plurality of bypass diodes 130. In some embodiments, the at least one bypass diode 130 is located within a section 131 of the photovoltaic module 110 that is located between a first edge 113 of the photovoltaic module 110 and the plurality of solar cells 120.

Figure 6:
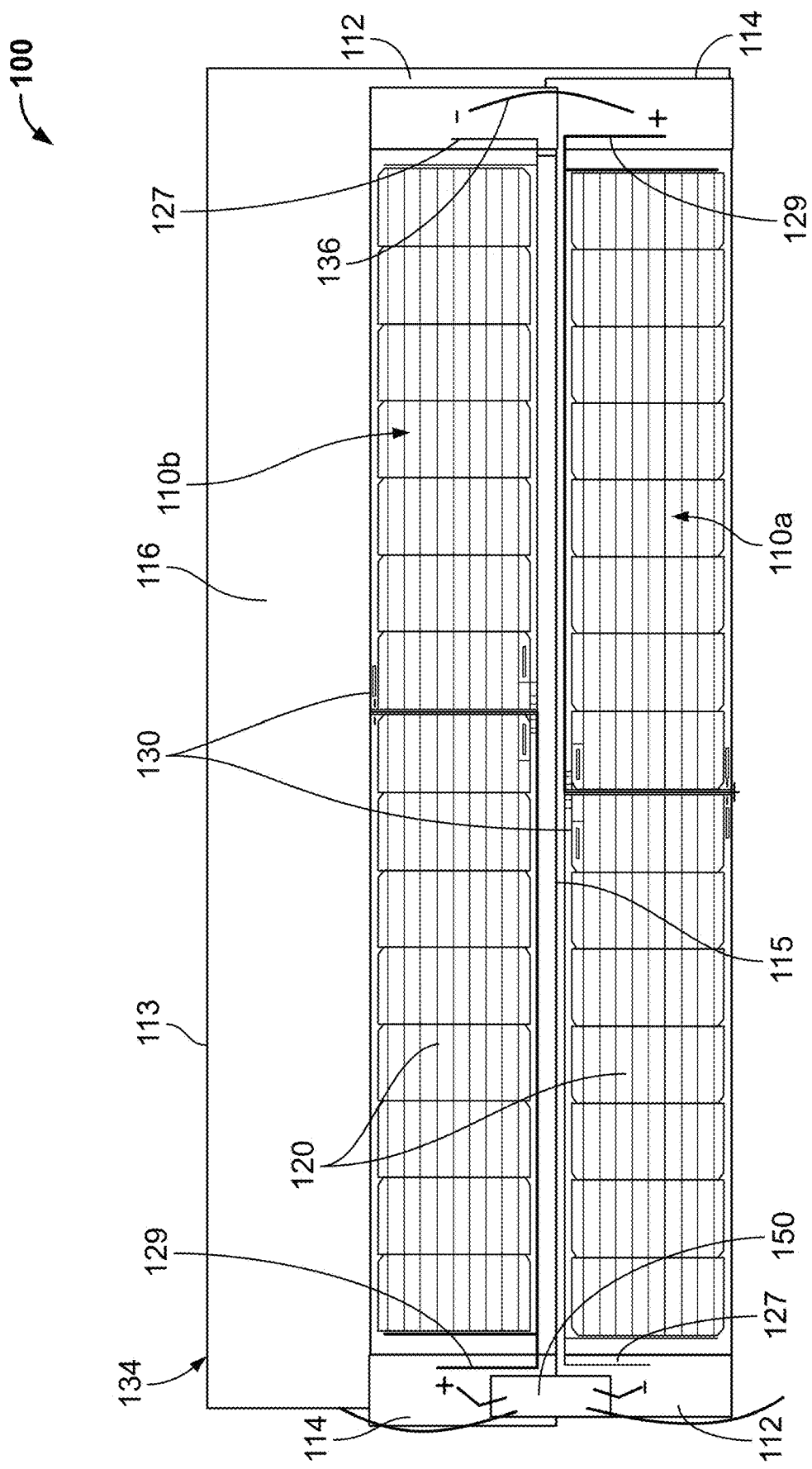
FIG. 6 is a top plan view of some embodiments of a photovoltaic shingle including photovoltaic modules shown in FIG. 5.

Referring to FIG. 6, in some embodiments, a photovoltaic shingle 100 includes a plurality of the photovoltaic modules 110. In some embodiments, the plurality of photovoltaic modules 110 is attached to a backsheet 134. In some embodiments, the plurality of photovoltaic modules 110 overlay the backsheet 134. In some embodiments each of the plurality of photovoltaic modules 110 is vertically stacked relative to one another on the backsheet 134. In some embodiments, the photovoltaic shingle 100 includes a headlap portion 116. In some embodiments, a portion of the backsheet 134 forms the headlap portion 116. In some embodiments, the backsheet 134 includes at least one layer. In some embodiments, the backsheet 134 includes at least two layers. In some embodiments, the backsheet 134 is composed of a polymeric material. In some embodiments, In some embodiments, the backsheet 134 is composed of polyethylene terephthalate ("PET"). In some embodiments, the backsheet 134 is composed of ethylene tetrafluoroethylene ("ETFE"). In some embodiments, the backsheet 134 is composed of an acrylic such as polymethyl methacrylate ("PMMA"). In some embodiments, the backsheet 134 is composed of thermoplastic polyolefin (TPO). In some embodiments, the backsheet 134 is composed of a single ply TPO roofing membrane. In some embodiments, non-limiting examples of TPO membranes are disclosed in U.S. Pat. No. 9,359,014 to Yang et al., which is incorporated by reference herein in its entirety. In some embodiments, the backsheet 134 is composed of polyvinyl chloride. In some embodiments, the backsheet 134 is composed of ethylene propylene diene monomer (EPDM) rubber. In some embodiments, the backsheet 134 includes a flame retardant additive. In some embodiments, the flame retardant additive may be clays, nanoclays, silicas, carbon black, metal hydroxides such as aluminum hydroxide, metal foils, graphite, and combinations thereof.

In some embodiments, the plurality of photovoltaic modules 110 is attached to the backsheet 134. In some embodiments, the plurality of photovoltaic modules 110 is attached to the backsheet 134 by an adhesive. In some embodiments, the plurality of photovoltaic modules 110 is attached to the backsheet 134 by thermal bonding. In some embodiments, the plurality of photovoltaic modules 110 is attached to the backsheet 134 by ultrasonic welding. In some embodiments, the plurality of photovoltaic modules 110 is attached to the backsheet 134 by thermal welding. In some embodiments, the plurality of photovoltaic modules 110 is attached to the backsheet 134 by mechanical fasteners. In some embodiments, the fasteners may include nails, screws, rivets, or staples.

Still referring to FIG. 6, in some embodiments, a first photovoltaic module 110a of the photovoltaic modules 110 is oriented such that it includes a negative terminal at the first end 112 and a positive terminal at the second end 114. In some embodiments, a second photovoltaic module 110b of the photovoltaic modules 110 is oriented 180 degrees relative to the first photovoltaic module 110a such that includes a positive terminal at the second end 114 (now on the "left" side as shown in FIG. 6) and a negative terminal at the first end 112 (now on the "right" side as shown in FIG. 6). In some embodiments, a power electronics unit 150 is electrically connected to the first branch 127 (negative terminal) of the first photovoltaic module 110a and the second branch 129 (positive terminal) of the second photovoltaic module 110b. In some embodiments, the power electronics unit 150 is electrically connected to the first and second photovoltaic modules 110a, 110b in a manner similar to that as described above with respect to the power electronics units 50 to the photovoltaic shingles 10. In some embodiments, the second branch 129 (positive terminal) of the first photovoltaic module 110a is electrically connected to the first branch 127 (negative terminal) of the second photovoltaic module 110b. In some embodiments, the second branch 129 (positive terminal) of the first photovoltaic module 110a is electrically connected to the first branch 127 (negative terminal) of the second photovoltaic module 110b by a jumper wire 136 (electrical jumper cable).

In some embodiments, a lower edge 115 of the photovoltaic module 110b overlays the section 131 of the first photovoltaic module 110a. In some embodiments, the lower edge 115 of the photovoltaic module 110b overlays the at least one bypass diode 130 of the first photovoltaic module 110a to reduce wasted space resulting from the section 131.

In some embodiments, the plurality of photovoltaic modules 110 attached to the backsheet 134 includes two of the photovoltaic modules 110. In some embodiments, the plurality of photovoltaic modules 110 attached to the backsheet 134 includes three of the photovoltaic modules 110. In some embodiments, the plurality of photovoltaic modules 110 attached to the backsheet 134 includes four of the photovoltaic modules 110. In some embodiments, the plurality of photovoltaic modules 110 attached to the backsheet 134 includes five of the photovoltaic modules 110. In some embodiments, the plurality of photovoltaic modules 110 attached to the backsheet 134 includes six of the photovoltaic modules 110. In some embodiments, the plurality of photovoltaic modules 110 attached to the backsheet 134 includes more than six of the photovoltaic modules 110.

Figure 7:
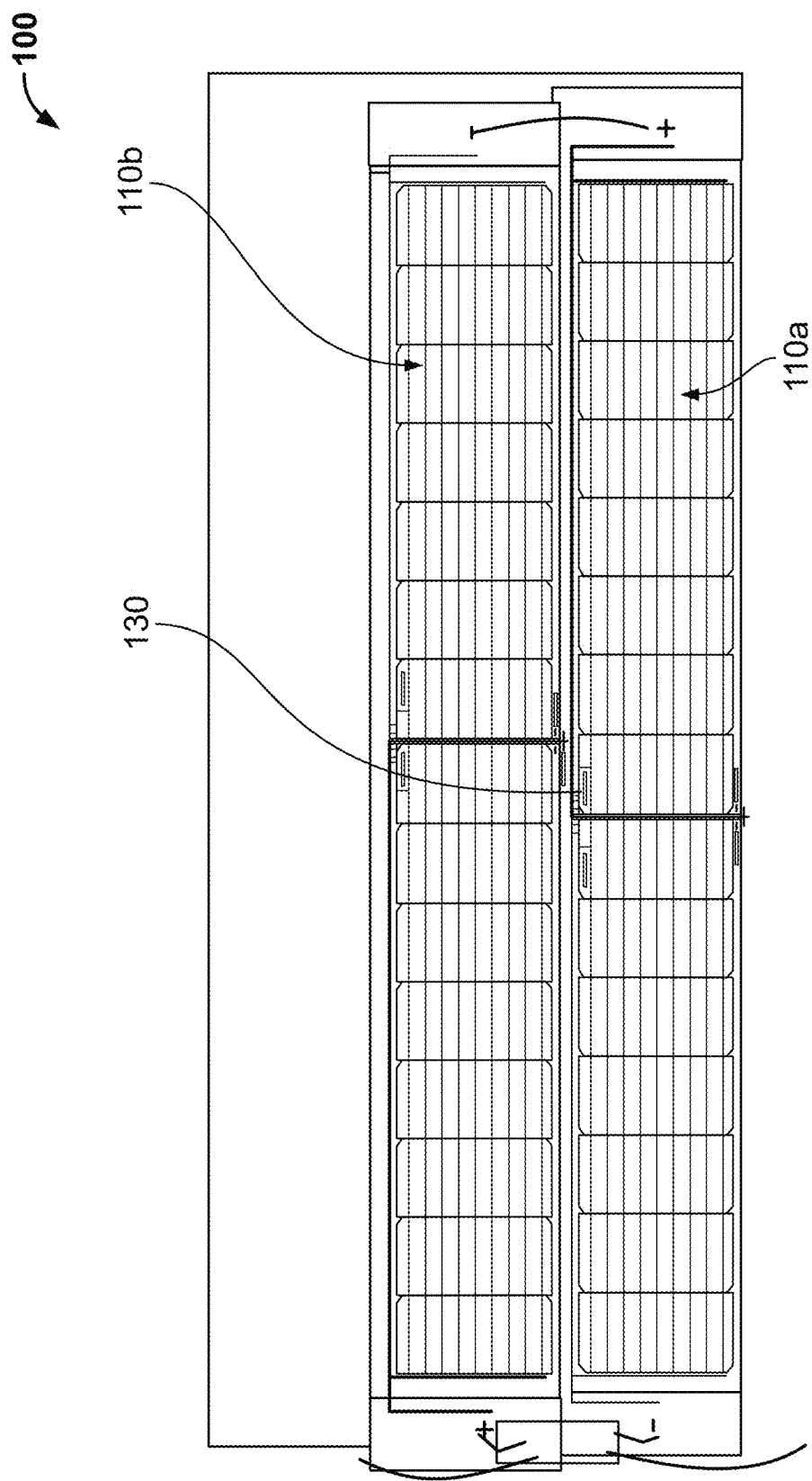
FIG. 7 is a top plan view of some embodiments of a photovoltaic module.
Figure 8:
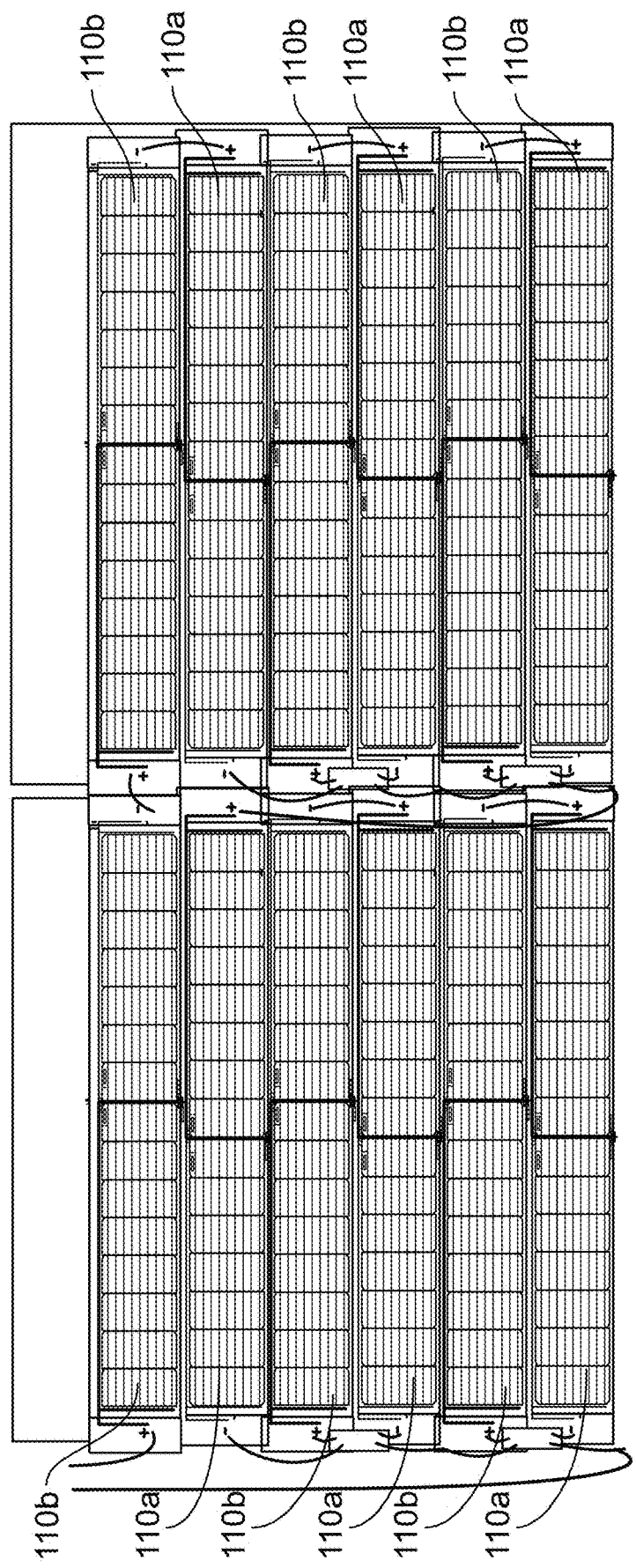
FIG. 8 is a top plan view of some embodiments of a roofing system including photovoltaic shingles having the photovoltaic modules shown in FIG. 7.

FIG. 7 illustrates the photovoltaic shingle 100 having the photovoltaic module 110b with the string of the solar cells 120 thereof reversed. In some embodiments, the string of solar cells 120 is reversed during lamination of the photovoltaic module 110b. In some embodiments, the first photovoltaic module 110a overlaps the section 131 containing the at least one bypass diode 130. In some embodiments, the first photovoltaic module 110a overlaps the section 131 thereof containing the at least one bypass diode 130 to reduce wasted space. FIG. 8 illustrates a plurality of the photovoltaic modules 110 installed on the roof deck with second photovoltaic module 110b having the reversed strings of solar cells 120.

Referring to FIG. 9, in some embodiments, a photovoltaic shingle 200 includes at least two photovoltaic modules 210a, 210b attached to backsheet 234. In some embodiments, the backsheet 234 forms a headlap portion 216. In some embodiments, each of the photovoltaic modules 210a, 210b includes a first end 212, a second end 214 opposite the first end 212, a first positive terminal 220a and a first negative terminal 220b proximate the first end 212, and a second positive terminal 222a and a second negative terminal 222b proximate the second end 214. In some embodiments, the second photovoltaic module 210b is vertically stacked and oriented 180 degrees relative to the first photovoltaic module 210a. Referring to FIG. 10, in some embodiments, the photovoltaic shingle 200 includes a third photovoltaic module 210c attached to a backsheet 234. In some embodiments, the third photovoltaic module 210c is vertically stacked and in the same orientation as the first photovoltaic module 210a. Referring to FIG. 11, in some embodiments, the second photovoltaic module 210b is horizontally positioned adjacent to, and oriented 180 degrees relative to, the first photovoltaic module 210a.

What is claimed is:

1. A system, comprising:
   a plurality of building integrated photovoltaic modules installed on a roof deck,
      wherein the plurality of building integrated photovoltaic modules is arranged in an array on the roof deck,
      wherein the plurality of building integrated photovoltaic modules includes a first building integrated photovoltaic module and a second building integrated photovoltaic module,
      wherein the first building integrated photovoltaic module is vertically adjacent to the second building integrated photovoltaic module,
      wherein each of the plurality of building integrated photovoltaic modules includes
         a plurality of solar cells arranged in at least one row, and
         a power electronics unit,
            wherein the power electronics unit is adjacent to a first end of one of the at least one row of the plurality of solar cells,
            wherein the power electronics unit is electrically connected to the plurality of solar cells,
            wherein the power electronics unit of the first building integrated photovoltaic module is electrically connected to the power electronics unit of the second building integrated photovoltaic module,
            wherein the power electronics unit includes a first terminal and a second terminal,
         a first electrical connector electrically connected to the plurality of solar cells, and
         a second electrical connector electrically connected to the plurality of solar cells,
         wherein the first terminal of the power electronics unit of the first building integrated photovoltaic module is electrically connected to the second electrical connector of the first building integrated photovoltaic module, and wherein the first terminal of the power electronics unit of the second building integrated photovoltaic module is electrically connected to the second electrical connector of the second building integrated photovoltaic module.

2. The system of claim 1, wherein the power electronics unit is horizontally adjacent to the first end of the one of the at least one row of the plurality of solar cells.

3. The system of claim 1, wherein the plurality of building integrated photovoltaic modules is a plurality of solar shingles.

4. The system of claim 1, wherein each of the first electrical connector and the second electrical connector includes a first connector and a second connector, wherein the first terminal of the power electronics unit of the first building integrated photovoltaic module is electrically connected to the first connector of the second electrical connector of the first building integrated photovoltaic module, and wherein the first terminal of the power electronics unit of the second building integrated photovoltaic module is electrically connected to the first connector of the second electrical connector of the second building integrated photovoltaic module.

5. The system of claim 4, wherein the power electronics unit of the first building integrated photovoltaic module is mechanically connected to the second electrical connector of the first building integrated photovoltaic module, and wherein the power electronics unit of the second building integrated photovoltaic module is mechanically connected to the second electrical connector of the second building integrated photovoltaic module.

6. The system of claim 5, wherein the first terminal of the power electronics unit of the first building integrated photovoltaic module is mechanically connected to the first connector of the second electrical connector of the first building integrated photovoltaic module.

7. The system of claim 6, wherein the first terminal of the power electronics unit of the second building integrated photovoltaic module is mechanically connected to the first connector of the second electrical connector of the second building integrated photovoltaic module.

8. The system of claim 7, wherein the second terminal of the power electronics unit of the first building integrated photovoltaic module is electrically connected to the second connector of the first electrical connector of the first building integrated photovoltaic module by a first electrical cable.

9. The system of claim 8, wherein the second connector of the second electrical connector of the first building integrated photovoltaic module is electrically connected to the first connector of the first electrical connector of the first building integrated photovoltaic module by a second electrical cable.

10. The system of claim 9, wherein the second terminal of the power electronics unit of the second building integrated photovoltaic module is electrically connected to the second connector of the first electrical connector of the second building integrated photovoltaic module by a third electrical cable.

11. The system of claim 10, wherein the second connector of the second electrical connector of the second building integrated photovoltaic module is electrically connected to the first connector of the first electrical connector of the second building integrated photovoltaic module by a fourth electrical cable.

12. The system of claim 11, wherein the power electronics unit includes a third terminal and a fourth terminal, wherein the third terminal of the power electronics unit of the first building integrated photovoltaic module is electrically connected to the fourth terminal of the power electronics unit of the second building integrated photovoltaic module by a fifth electrical cable.

13. The system of claim 12, further comprising a third electrical connector installed on the roof deck, wherein each of the power electronics unit of the first building integrated photovoltaic module and the power electronics unit of the second building integrated photovoltaic module is electrically connected to the third electrical connector.

14. The system of claim 13, wherein the third electrical connector includes a first connector and a second connector, wherein the third terminal of the power electronics unit of the second building integrated photovoltaic module is electrically connected to the first connector of the third electrical connector by a sixth electrical cable.

15. The system of claim 14, wherein the fourth terminal of the power electronics unit of the first building integrated photovoltaic module is electrically connected to the second connector of the third electrical connector by a seventh electrical cable.

16. The system of claim 1, wherein the power electronics unit includes a housing and power electronics within the housing.

17. The system of claim 16, wherein the power electronics includes an optimizer, a bypass diode, system monitoring electronic components, a rapid shutdown device, an electronic communication component, or combinations thereof.

18. The system of claim 1, wherein the plurality of building integrated photovoltaic modules is installed on the roof deck by a plurality of fasteners.

19. The system of claim 1, wherein the plurality of building integrated photovoltaic modules includes a third building integrated photovoltaic module, wherein the third building integrated photovoltaic module is horizontally adjacent to the first building integrated photovoltaic module.

20. The system of claim 19, wherein the plurality of building integrated photovoltaic modules includes a fourth building integrated photovoltaic module, wherein the fourth building integrated photovoltaic module is horizontally adjacent to the second building integrated photovoltaic module.

21. The system of claim 20, wherein the fourth building integrated photovoltaic module is vertically adjacent to the third building integrated photovoltaic module.

22. The system of claim 21, wherein the power electronics unit of the third building integrated photovoltaic module is electrically connected to the power electronics unit of the fourth building integrated photovoltaic module.

23. A system, comprising:
a plurality of building integrated photovoltaic modules installed on a roof deck,
wherein the plurality of building integrated photovoltaic modules is arranged in an array on the roof deck,
wherein the plurality of building integrated photovoltaic modules includes a first building integrated photovoltaic module and a second building integrated photovoltaic module,
wherein the first building integrated photovoltaic module is vertically adjacent to the second building integrated photovoltaic module,
wherein each of the plurality of building integrated photovoltaic modules includes
a plurality of solar cells arranged in at least one row,
a first electrical connector electrically connected to the plurality of solar cells, and
a second electrical connector electrically connected to the plurality of solar cells;
a first power electronics unit,
wherein the first power electronics unit includes a first terminal and a second terminal,
wherein the first power electronics unit is adjacent to a first end of one of the at least one row of the plurality of solar cells of the first building integrated photovoltaic module,
wherein the first power electronics unit is electrically connected to the plurality of solar cells of the first building integrated photovoltaic module; and
a second power electronics unit,
wherein the second power electronics unit includes a first terminal and a second terminal,
wherein the second power electronics unit is adjacent to a first end of one of the at least one row of the plurality of solar cells of the second building integrated photovoltaic module, and
wherein the first power electronics unit is electrically connected to the second power electronics unit, and wherein the first terminal of the first power electronics unit is electrically connected to the second electrical connector of the first building integrated photovoltaic module, and wherein the first terminal of the power electronics unit of the second building integrated photovoltaic module is electrically connected to the second electrical connector of the second building integrated photovoltaic module.

24. A method, comprising:
obtaining a plurality of building integrated photovoltaic modules,
  wherein each of the plurality of building integrated photovoltaic modules includes
    a plurality of solar cells arranged in at least one row, and
    a power electronics unit,
      wherein the power electronics unit is adjacent to a first end of one of the at least one row of the plurality of solar cells,
      wherein the power electronics unit is electrically connected to the plurality of solar cells
      wherein the power electronics unit includes a first terminal and a second terminal,
    a first electrical connector electrically connected to the plurality of solar cells, and
    a second electrical connector electrically connected to the plurality of solar cells; and
installing at least a first building integrated photovoltaic module and a second building integrated photovoltaic module on a roof deck,
  wherein the first building integrated photovoltaic module is vertically adjacent to the second building integrated photovoltaic module, and
  wherein the power electronics unit of the first building integrated photovoltaic module is electrically connected to the power electronics unit of the second building integrated photovoltaic module, and
  wherein the first terminal of the power electronics unit of the first building integrated photovoltaic module is electrically connected to the second electrical connector of the first building integrated photovoltaic module, and wherein the first terminal of the power electronics unit of the second building integrated photovoltaic module is electrically connected to the second electrical connector of the second building integrated photovoltaic module.

25. The method of claim 24, further comprising installing a third building integrated photovoltaic module and a fourth building integrated photovoltaic module on the roof deck, wherein the third building integrated photovoltaic module is horizontally adjacent to the first building integrated photovoltaic module, and wherein the fourth building integrated photovoltaic module is horizontally adjacent to the second building integrated photovoltaic module and vertically adjacent to the third building integrated photovoltaic module.

26. The method of claim 24, wherein the plurality of building integrated photovoltaic modules is a plurality of solar shingles.

27. The method of claim 24, wherein the plurality of building integrated photovoltaic modules is installed on the roof deck by a plurality of fasteners.

28. The system of claim 1, wherein the at least one row includes a plurality of rows, wherein the plurality of rows includes a first row and a second row above the first row, wherein the first electrical connector is proximate to the first end of the first row and electrically connected to the first row of the plurality of solar cells, and the second electrical connector is proximate to a first end of the second row and electrically connected to the second row of the plurality of solar cells.

29. The system of claim 28, wherein each of the plurality of rows includes a second end opposite the first end of the row, wherein each of the first building integrated photovoltaic module and the second building integrated photovoltaic module includes a first negative electrical terminal located at the first end of the first row thereof, a first positive electrical terminal located at the second end of the second row thereof, a second positive electrical terminal located at the first end of the second row thereof, and a second negative terminal located at the second end of the second row thereof.

30. The system of claim 23, wherein each of the first power electronics unit and second power electronics unit includes an optimizer, a bypass diode, system monitoring electronic components, a rapid shutdown device, an electronic communication component, or combinations thereof.

* * * * *